May 6, 1969 W. A. BOOTHE 3,441,996

METHOD OF MANUFACTURING LAMINATED FLUID AMPLIFIERS

Filed Nov. 30, 1966

Inventor
Willis A. Boothe
by Paul A. Frank
His Attorney

United States Patent Office 3,441,996

Patented May 6, 1969

3,441,996

METHOD OF MANUFACTURING LAMINATED FLUID AMPLIFIERS

Willis A. Boothe, Scotia, N.Y., assignor to General Electric Company, a corporation of New York Continuation-in-part of application Ser. No. 248,630, Dec. 31, 1962. This application Nov. 30, 1966, Ser. No. 616,140

Int. Cl. B21d 53/00

U.S. Cl. 29—157 15 Claims

ABSTRACT OF THE DISCLOSURE

Fluid amplifiers are manufactured by forming a fluid flow pattern in laminates, and then stacking a number of the laminates to obtain a desired fluid flow capacity. The laminates are superposed between two cover plates and are fastened together in fluid-tight relationship by diffusion bonding or other methods to form a unitary structure.

CROSS-REFERENCES TO RELATED APPLICATIONS

This application is a continuation-in-part of my copending application Ser. No. 248,630 entitled, "Fluid Amplifier and Method of Manufacture" filed Dec. 31, 1962, now abandoned, and assigned to the same assignee as the present invention.

BACKGROUND OF THE INVENTION

Field of the invention

My invention relates to a fluid amplifier device and in particular, to a new structural arrangement for fluid amplifier devices and to a method of fabrication thereof.

Description of the prior art

Fluid amplifier devices have an important place in the field of fluid power and control and are especially useful as analog and digital computing elements. These devices feature inherent reliability since they generally employ no mechanical moving parts other than the fluid and very low cost since they may be fabricated from virtually any material that is nonporous and has structural rigidity. The devices will operate on both incompressible fluids such as liquids and compressible fluids such as gases, including air, it being understood that the material comprising the fluid amplifier be compatible with the fluid passing therethrough.

Fliud amplifiers operate on the basis of deflecting a fluid power jet. In the conventional form, a constant main fluid flow comprising a relatively high pressure power jet issues from a fluid flow restrictor, a power nozzle, and impinges upon at least one of two fluid flow receivers. A deflection or control of the power jet in an interaction region is obtained by means of a control fluid flow comprising a relatively low pressure control jet issuing from a pair of fluid flow restrictors, control nozzles, positioned in opposing relationship to the power jet and generally perpendicular thereto. The arrangement of the power nozzle, control nozzles and receivers described, form what is conventionally known as a fluid amplifier, it being understood that the amplifier designation is in no way a limitation on the possible use of the device. Thus, in addition to pure amplification for fluid power applications, the fluid amplifier may be employed in digital computer circuits to perform logic functions such as AND or OR logic and in analog computer circuits to perform mathematical functions such as addition and intergration.

A broad class of fluid amplifiers may have identical arrangements of power and control nozzles and receivers, and differ only in flow capacity or fluid pressure range ratings. Previous methods for fabricating fluid amplifiers have involved techniques such as photoetching in glass or plastic, molding and machining. All of these fabricating techniques result in a fluid amplifier constructed from a single piece of material containing the fluid flow configuration and one or two cover members. Thus to produce a plurality of fluid amplifiers having identical configurations of fluid flow paths therein but differing in flow capacities has necessitated further fabrication steps, an economically inefficient method for large scale production. For specialized fluid amplifier applications where odd shaped fluid flow restrictors are necessary, the previous fabricating techniques have required setting up separate fabrication lines to obtain the different shapes. Since one of the chief advantages of fluid amplifiers should be their very low cost, a need exists for developing an economically practical method for fabricating fluid amplifiers which have identical arrangements of fluid flow elements and differ only in flow capacity. This economically practical method should also provide a simple means for fabricating fluid amplifiers having odd shaped fluid flow restrictors.

SUMMARY OF THE INVENTION

Therefore, one of the principal objects of my invention is to develop an economically efficient method of manufacturing a new structural arrangement of a fluid amplifier or multi-amplifier circuit.

Another object of my invention is to develop an economically efficient method for fabricating a plurality of fluid amplifiers which differ only in their flow capacity rating.

A still further object of my invention is to develop an economically efficient method for fabricating a fluid amplifier having odd shaped fluid flow restrictors.

Briefly stated, my invention is a method for fabricating a fluid amplifier device that consists of severing thin sheets of nonporous structurally rigid material to form a plurality of laminations and then individually forming a particular fluid flow configuration through selected ones of the laminations. A predetermined number of the flow configuration formed laminations are then superposed between two configuration nonformed laminations to obtain the desired flow capacity of the amplifier, and the laminations are fastened together in a suitable manner such as by diffusion bonding to form a unitary fluid-tight structure.

The features of my invention which I desire to protect herein are pointed out with particularity in the appended claims. The invention itself, however, both as to its organization and method of operation, togeher with further objects and advantages thereof, may best be understood by reference to the following description taken in connection with the accompanying drawing, wherein like parts in each of the several figures are identified by the same reference character and wherein:

DESCRIPTION OF THE PREFERRED EMBODIMENTS

Figure 1:
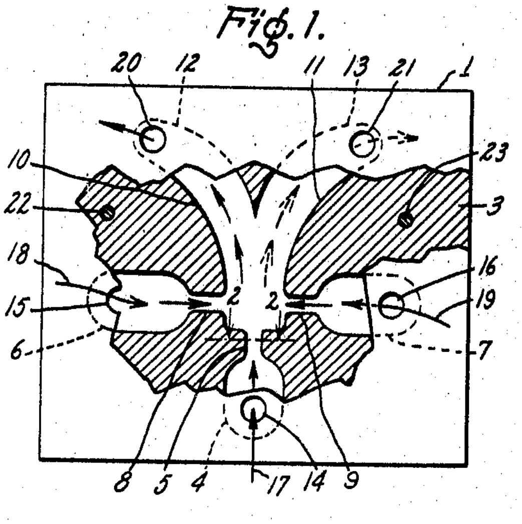
FIGURE 1 is a plan view of a digital fluid amplifier constructed in accordance with my invention with the top lamination containing fluid entrance and exit means being partly broken away to illustrate the laminations containing the punched-through fluid flow configuration.

Conventional fluid amplifiers comprise a structure that is constructed from at least two members. A fluid flow configuration is provided in a base member, and a flat cover member is then attached thereto for confining the fluid flow within paths defined by the configuration and the enclosing surface of the cover member. An economically efficient method for fabricating fluid amplifiers on a large production scale must involve a process whereby the various members of the amplifier are produced very rapidly from a low cost material. Since the fluid flow passages defined by the configuration are generally rectangular in cross section, a very rapid process for producing amplifiers having identical fluid flow configurations could employ the stamping of members and then forming the desired configuration therethrough. Suitable machines can perform these operations at a very rapid rate. This relatively simple and economical method would consist in stamping the amplifier in three separate members wherein one member would have the fluid flow configuration formed therethrough and the other two members would form cover plates on either side thereof. The problem with this simple approach is that it is not desirable to form configurations which have width dimensions smaller than the thickness of the material since this produces roughness on the bottom edges of the flow configuration. In a fluid amplifier, restrictor flow passages which form the nozzles may have a considerably smaller dimension in width than in depth. This is particularly true in the larger flow capacity amplifiers wherein the configuration of the various flow paths may be identical to smaller flow capacity amplifiers, the increased flow capacity being obtained by increasing the thickness dimension of the amplifier. It is especially desirable to have the fluid flow restrictors considerably narrower than the overall thickness of the amplifier for aerodynamic reasons.

A method of fabricating fluid amplifiers in accordance with my invention basically employs the above suggested method but overcomes the inherent disadvantages therein described. My method consists in forming the fluid amplifier from a plurality of superposed thin laminations containing the fluid flow pattern and then fastening other laminations in a suitable manner to enclose the fluid flow pattern and form a unitary fluid-tight structure. My method of fabricating fluid amplifiers is as follows: The first step involves severing in a suitable manner such as by stamping or cutting, a relatively thin sheet of nonporous structurally rigid material to form a plurality of equidimensional stampings or laminations. This cutting process may be performed very rapidly with a suitable machine. A plurality of coincident guide holes may then be simultaneously formed such as by punching through each of these laminations. It is to be understood that this guide hole punching process is not essential to the overall fabrication method but it does aid in the further process of superposing and assemblying the laminations to form a unitary structure as described hereinafter. The material form which the lamintaions are formed depends upon the particular environment in which the fluid amplifier will operate. Thus for high temperature applications such as in a gas turbine power plant or nuclear power plant the material may be stainless steel. For room temperature applications such as in machine tool control, the material may be brass, aluminum, copper or mild steel. The materials are not limited to metals, and glass and low cost plastics such as polyesters and polyvinyl chloride may also be employed. For relatively low pressure and low temperature applications a material such as cardboard may even be used. The proper selection of the appropriate material involves determining the most economical material which will be compatible in the environment of the fluid amplifier and which is most readily adapted to the various steps included in my method of fabrication. The thickness of the sheet of material that is cut into laminations may conveniently be from .001 to .005 inch, although this range is not to be construed as a limitation.

In the next step, a particular fluid flow configuration or pattern is succesively formed through a first group of selected ones of the laminations. The flow pattern may be formed in any suitable manner such as by chemical methods (photoeteching) or mechanical methods (machining, punching). In the alternative, the coincident guide holes and flow path pattern may be simultaneously formed to increase production speed. The fluid flow path pattern includes the various fluid flow restrictions such as the power and control nozzles, fluid supply means in the form of input flow paths to these restrictions, a fluid flow interaction region which carries the jets that issue from the restrictions, and fluid flow receivers which form the selective outputs of the interaction regions. For fabricating fluid amplifiers having fluid flow restrictors and flow paths of rectangular cross sections, an identical and coincident fluid flow configuration is formed through each of the laminations forming the first group. The most common fluid amplifiers employ two control nozzles and two receivers, but in all cases include at least one control nozzle and one receiver. My invention is not limited to the fabrication of single fluid amplifiers, and thus the fluid flow configuration can comprise the flow paths of a plurality of interconnected fluid amplifiers within each of the laminations to thereby obtain a laminated structure comprised of a plurality of fluid amplifiers interconnected to form a desired fluidic circuit.

A plurality of coincident round holes are then successively formed in a second group of the laminations. The second group of laminations form the top cover member of the amplifier and the round holes therein form the fluid entrance and exit means. These holes are positioned so as to be superimposed over selected regions of the input flow paths and receivers in the first group of laminations. A third group of the equidimensional lamintaions containing at most only the guide holes, are used to form the base members of the fluid amplifiers. It should be apparent that the guide holes have been formed outside the fluid flow configuration and are preferably on opposing sides of the equidimensional laminations to provide adequate guide means for superposing the laminations.

A unitary structure is next assembled from the laminations. A predetermined number of laminations from the first group, the fluid flow configuration formed laminations, are superposed in congruent relationship whereby the various flow paths, interaction regions and fluid flow restrictors coincide to form smooth vertical walls within the fluid amplifier. This smooth surface which permits smooth fluid flow within the amplifier, is achieved since the material from which the laminations have been cut is thinner than any of the width dimensions in the fluid flow configuration and no rough edge laminations are formed in the configuration forming process. The number of these laminations is determined by the flow capacity range of the resulting fluid amplifier. Thus a large flow capacity amplifier employs a larger number of these laminations than a smaller flow capacity amplifier. The laminations from this first group are superposed between at least one lamination from the second group containing the guide and fluid entrance and exit holes and at least one lamination from the third group containing only the guide holes. It should be apparent that the most convenient method for superposing the laminations of the three groups is to first place the laminations from the third group in place and then superpose thereon the laminations from the first group and finally the laminations from the second group. The number of laminations from the second and third groups that are employed in a particular fluid amplifier are determined primarily by the fluid pressure therein and the material forming the laminations. Thus for a low pressure fluid flow it may be possible to employ only one lamination from each of these two groups. As a practical matter, the laminations from these second and third groups, which form respectively the top and bottom members of the fluid amplifier, may each comprise several laminations. The top member in particular may consist of several laminations in order to provide adequate support means within the fluid flow entrance and exit holes for external hose tubing or piping connections to the fluid amplifier whereby fluid may be supplied respectively thereto and away therefrom. The superpositioning of the various laminations may be performed automatiually by a suitable machine or by hand. If the guide holes are punched through the laminations, guide pins may be inserted therein for accurate superpositioning of the various laminations.

The superposed laminations are then fastened together in a suitable manner to form a fluid-tight unitary structure. The fastening may be accomplished by mechanical means, by use of an adhesive or by metallurgical joining methods in the particular case of metallic materials. The mechanical method may consist of passing threaded rods through the guide holes and then clamping the laminations together by tightening a nut and washed arrangement on the rods. Bolts may also be screwed through the guide holes and the laminations clamped together by tightening nuts thereon. Numerous other mechanical methods may also be utilized, the aforementioned examples being merely illustrative of two methods.

An adhesive may be employed as the fastening agent for relatively low temperature applictions of the fluid amplifier. The adhesive may be applied to the surfaces of the laminations before superposition thereof, or after superposition by any process including the hereinabove described step of employing guide holes and guide pins while retaining the laminations in noncontacting relationship. A pressure sufficient to obtain an adhesive bond of the laminations must also be applied, the pressure, if any, being determined by the particular adhesive employed. Suitable adhesives are a polyurethane adhesive which is especially appropriate for cryorgenic applications, and a silicone adhesive which may be employed in temperature applications from −80° C. to +225° C. An adhesive which is suitable for use at room temperature consists of equal parts by weight of a polyamide and epoxy resin. No primer or catalyst is required in applying this adhesive and it may be cured at room temperature or an elevated temperature as high as 80° C. to effect more rapid curing. This adhesive is strong and relatively independent of the thickness of adhesive applied. Further, this adhesive is relatively impermeable and inert to most fluids at room temperatures and satisfactorily joins most metals and many plastics such as polyester.

Another and preferred method for fastening the superposed laminations especially for relatively high temperature applications, is diffusion bonding in the case of metallic laminations. In this method the metallic interfaces are first cleaned to remove any contaminating surface film and then assembled under pressure sufficient to achieve good physical contact between adjacent laminations. For the metals used in fluid amplifier construction, such as beryllium copper and stainless steel (300 series), the assembly is then placed within an extremely dry hydrogen atmosphere in a furnace and maintained at an elevated temperature for a predetermined length of time sufficient to achieve a desired diffusion bond of the laminations. The particular pressure, temperature and time interval is dependent on the metal, and publications such as the Welding Research Council Bulletin No. 109, dated October 1965, entitled, "A Review of Diffusion Welding," by J. M. Gerken and W. A. Owczarski summarize these parameters for various metals. As a specific example, stainless steel laminations are diffusion bonded at a temperature of 2100° F., a pressure of 10,000 p.s.i. and a time interval of 1 to 3 hours. The temperature is very critical since an increase or decrease in the order of 5 to 10 degrees respectively decreases or increases the required time interval by a factor of approximately 50%.

Another method for fastening metallic laminations together is brazing. This method employs higher relative temperatures and shorter time intervals than diffusion bonding whereby faster production may be attained. The brazing is accomplished by applying a suitable braze or filler material between the laminations which may be superpositioned by any process including the hereinabove described step of employing guide holes and guide pins. The brazing material is applied before, or after the laminations have been superposed but while still in noncontacting relationship and then induction heating the assembly in a hydrogen furnace. Since stainless steel may be brazed within several minutes at temperatures between 1100° F. and 1600° F.., the fabricated fluid amplifier may be employed in the relatively highest temperature applications, just below the brazing temperature such as 1000° F.

A further method for fastening the laminations together requires a previous step of punching undersized guide holes through each lamination. The laminations are then forced down over normal sized guide pins to provide a force fit. The guide pins are coincident with and equal in number to the guide holes and are retained within a base member to serve as individual mandrels. No further fastening would then be necessary since the force fit can provide a fluid-tight seal.

After the laminations have been fastened together by any of the above mentioned methods, the fluid amplifier could be put into use merely by inserting suitable tubing, hoses or piping into the fluid entrance and exit holes of the top cover member. Although these holes are round, leakage may occur at these junctions due to the nonrigid connection, especially in higher fluid pressure applications. These holes are therefor preferably tapped, prior to assembly of the laminations to form internal screw threads therein whereby suitable tubing connections are provided. The coupling end of the tubing may then be threaded into this tapped hole to provide leak free connections. In the alternative, manifolding means may be employed instead of tubing and tapped holes.

Referring particularly to the plan view of a fluid amplifier fabricated in accordance with my invention and illustrated in FIGURE 1, there is shown a top lamination, designated as a whole by numeral 1, partially broken away to illustrate a lamination indicated as sectioned layer 3 containing a fluid flow configuration. The fluid flow configuration illustrated herein includes a main fluid input flow path or supply means 4, a fluid flow restrictor 5 which functions as a power nozzle, two control fluid input flow paths or supply means 6, 7 and their associated fluid flow restrictors which fuhction as control nozzles 8 and 9 respectively, fluid flow paths 10 and 11 which form passage means for the deflected power jet, and fluid flow receivers 12 and 13 which are adapted to receive the deflected power jet. Fluid entrance holes 14, 15 and 16 are positioned to be in fluid communication with the respective input flow paths 4, 6, 7 over which they are superposed. Thus, fluid entrance hole 14 provides a passage wherein a tubing connection may be inserted and a main fluid supplied therethrough as indicated by arrow 17. The main fluid flow then enters main fluid input means 4 and since the fluid is under pressure, it passes through fluid flow restrictor 5 and issues therefrom as a power jet. In like manner, control fluid flows indicated by arrows 18 and 19 enter respective fluid entrance holes 15 and 16 and pass into control fluid input flow passage means 6 and 7 respectively and issue from fluid flow restrictors 8 and 9 as control jets. These control jets provide a deflection of the power jet whereby the deflected power jet is directed toward a predetermined fluid flow receiver 12 or 13 in accordance with the differential pressure or fluid flow of the two control jets. Thus, the power jet is deflected to receiver 12, as illustrated by the solid arrows approaching thereto when the fluid pressure of flow capacity is greater at control fluid flow restrictor 9 than at restrictor 8. In like manner when the pressure or flow is greater at restrictor 8 than 9, the power jet is deflected toward receiver 13 as indicated by dash lines. After the fluid enters receiverss 12 or 13 it passes through respective fluid exit holes 20 or 21 in the top lamination and then passes out of the fluid amplifier through tubing or manifolding means which is suitably connected therein.

In the particular fluid flow configuration illustrated in FIGURE 1, a minimum number of two guide holes 22, 23, need be employed to fix the superposed laminations in coincident relationship and thereby provide smooth walls for smooth fluid flow within the amplifier. The need for only two guide holes results from the fact that the fluid flow pattern is completely enclosed within the boundary of the laminations.

Figure 2:
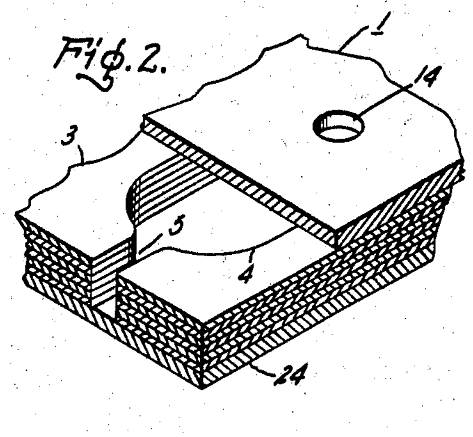
FIGURE 2 is an enlarged fragmentary view of a rectangular cross section flow restriction, the restrictor being the power nozzle taken on the plane of line 2—2 of FIGURE 1, the view being shown in perspective.

The fluid flow pattern formed through the first group of laminations 3 may be identical in each of these laminations. In such case the fluid flow restrictors have a rectangular cross section as illustrated in FIGURE 2. This illustration is an enlarged fragmentary view shown in perspective and taken on the plane of line 2—2 of FIGURE 1 and thus illustrates the power nozzle 5 restrictor. Although the laminations comprising the fluid amplifier may all be of equal thickness, the enclosing members, top and bottom members 1 and 24 respectively, may comprise relatively thicker laminations than those of the fluid flow configuration formed laminations. This alternative permits the use of but a single top and bottom member lamination rather than the possible need for employing several of the thin laminations in place thereof as heretofore described.

Figure 3:
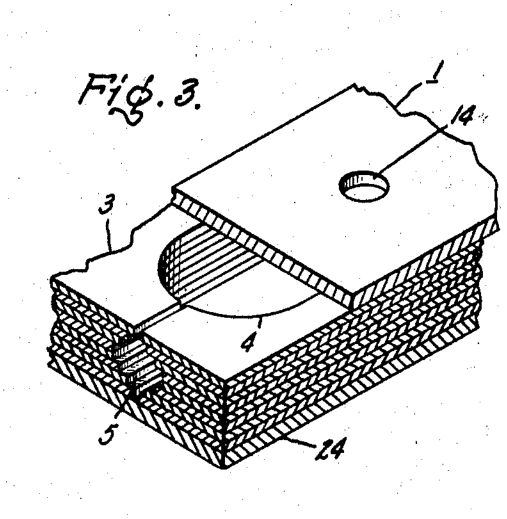
FIGURE 3 illustrates a second embodiment of a power nozzle as shown in FIGURE 2, this particular configuration illustrating an odd shaped flow restriction.

For some applications it is desirable to use contoured or odd shaped fluid flow restrictors such as the diamond shape 5 of FIGURE 3. The intersection of jets from such odd shapes produce predictable reactions which may be employed in fluid function generators. Such odd shaped restrictors may be made by slightly varying from lamination to lamination the restrictor portion of the fluid flow pattern that is formed through the laminations 3 of the first group.

Figure 4:
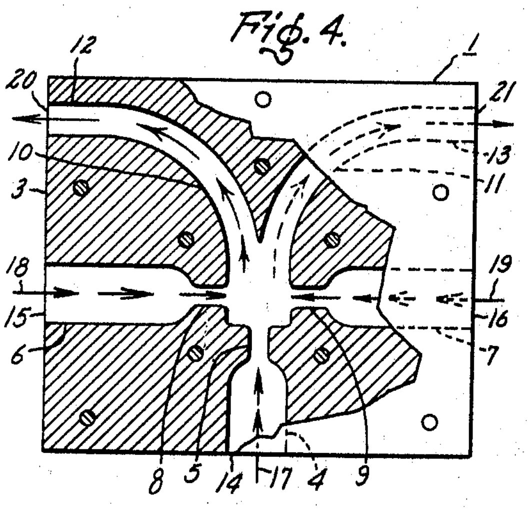
FIGURE 4 illustrates a second embodiment of a fluid amplifier as shown in FIGURE 1, this particular amplifier having fluid entrance and exit means disposed in the sides thereof.

The fluid entrance and exit means of a fluid amplifier need not be disposed within top member 1. FIGURE 4 illustrates a second embodiment of a fluid amplifier wherein the fluid entrance and exit means are disposed within the sides of the lamination containing the fluid flow patterns. In this particular embodiment, the desired fluid flow pattern extends to the edges of the laminations 3 whereby forming the pattern through these laminations results in a plurality of individual pieces being formed in each lamination layer. A greater number of guide holes must be employed in this embodiment since at least two guide holes per individual piece are necessary for proper assembly of this amplifier. Further, the guide holes here are not merely a convenience for assembly purposes but are necessary to obtain smooth walls within the amplifier. The top and bottom members 1 and 24 of the amplifier may comprise a single or plurality of the thin laminations as heretofore described or may comprise single relatively thick laminations as indicated in FIGURES 2 and 3. The laminations are superposed and fastened together by any of the previously described techniques. After the assemblying step, fluid entrance and exit holes are provided at the input and output flow passage defined at the edges of the laminations. Thus round holes 14, 15, 16, 20 and 21 are drilled into input flow paths 4, 6, 7 and receivers 12 and 13 respectively, to provide the necessary round configuration for external tubing connections. The drilling is most conviently accomplished by utilizing a different lamination in the central location of the assembly. This central lamination has the same flow pattern as the other laminations, but the pattern does not extend to the edges thereof and a small notch is formed across the edge of the lamination coaxially with the desired fluid entrance or exit axis. The notch serves as a guide point for the drill bit in the same manner as would a center punch. It should be apparent that these round holes are not drilled if the cross section of the flow passages is already circular. In the most common applications this cross section will be rectangular since laminations having identical fluid flow patterns will be superposed to form the flow passages. The drilled holes are then tapped to form internal screw threads for the tubing connections. Another method for providing the fluid entrance and exit holes is to counterbore the openings to permit insertion of external tubing directly for a braze or solder joint. If desired, a transition in the laminations can be provided to obtain smooth flow between the circular cross section of the external tubing and amplifier rectangular cross section. The advantages of the fluid path configuration illustrated in the FIGURE 4 embodiment are the lower turbulence and losses produced by the fluid entering or exiting from the fluid amplifier. In the FIGURE 1 embodiment, a higher degree of turbulence will occur since the fluid encounters 90° bends as it enters and exits from the formed fluid flow configuration.

The sizes of fluid amplifiers are conventionally designated in terms of the width dimension of the power jet restrictor. Small size amplifiers have restrictor widths less than .020 inch, medium size amplifiers from .020 to 0.100 inch, and large size amplifiers from 0.100 inch upward.

From the foregoing description, it can be appreciated that my invention makes available a new method for fabricating a fluid amplifier or multiamplifier circuit having a new structural arrangement consisting of a plurality of superposed laminations. A fluid flow pattern defined within the amplifier is produced by a relatively simple, rapid and economical process of successively forming the pattern through selected laminations. These laminations are then assembled to a desired overall thickness between laminations which are unformed with the fluid flow pattern and this assembly is then fastened in a suitable manner to form the unitary structure of the fluid amplifier. Fluid amplifiers having odd shaped fluid flow restrictors are also readily fabricated by this method by slightly varying the restrictor portion of the fluid flow pattern from lamination to lamination. Two embodiments of my new method for fabricating fluid amplifiers have been disclosed herein, namely, a first method which includes forming a fluid flow pattern that is totally enclosed within the boundary of the laminations and a second method wherein this pattern extends to the edges of the laminations. In each of these embodiments the laminations forming the top and bottom enclosing members may comprise laminations having the same thickness as the pattern punched laminations therebetween or thicker laminations whereby only one top and bottom lamination need be used. The new structural arrangement of the assembled fluid amplifier may have fluid flow restrictions of rectangular cross section in the case where identical pattern formed laminations are employed or may have add shaped cross sections where nonidentical laminations are employed.

Having described new methods for fabricating fluid amplifier devices in accordance with my invention, it is believed obvious that other modifications and variations of my invention are possible in the light of the above teachings. For example, the laminations containing the fluid flow configuration need not all be of the same thickness dimension and thereby provide greater flexibility in obtaining odd shaped cross section. Also, the fluid entrance and exit holes need not all be confined either to the top member or the sides of the structure, but may have some of the holes located within the top member and the remaining ones within the sides of the structure. Further, although only digital type fluid amplifiers have been illustrated herein, analog type fluid amplifiers may also be constructed in accordance with the methods described hereinabove. It is therefore, to be understood that changes may be made in the particular embodiments of my invention described which are within the full intended scope of the invention as defined by the following claims.

What I claim as new and desire to secure by Letters Patent of the United States is:

1. A method for fabricating fluid amplifiers comprising the steps of severing sheets of nonporous structurally rigid material to form a plurality of uniform laminations, forming a particular fluid flow configuration defining a fluid amplifier characterized by having at least two input fluid flow paths and one output fluid flow path through selected ones of the plurality of laminations, superposing predetermined numbers of the flow configuration formed laminations between at least two laminations characterized by surfaces unformed with the particular configuration to form laminated structures having desired thicknesses wherein the predetermined number is a direct function of the flow capacity of the fluid amplifier being fabricated, and fastening the superposed laminations together to form unitary structures each having fluid flow paths defined by the particular configurations formed and configuration unformed laminations.

2. The method for fabricating fluid amplifiers set forth in claim 1 wherein the step of severing sheets of material to form a plurality of uniform laminations comprises severing relatively thin sheets of the material to form a first plurality of relatively thin laminations, and severing relatively thick sheets of the material to form a second plurality of relatively thick laminations, successively forming the particular fluid flow configuration through the plurality of relatively thin laminations, and superposing predetermined numbers of the relatively thin laminations in congruent relationship between two of the relatively thick laminations to form laminated structures having desired thicknesses.

3. The method for fabricating fluid amplifiers set forth in claim 1 wherein the step of severing sheets of the material to form a plurality of uniform laminations comprises severing sheets of the material, each sheet being of equal thickness in the range of .001 to .005 inch, and the step of forming a particular fluid flow configuration comprises forming the flow paths of a plurality of interconnected fluid amplifiers within each of the selected laminations to thereby fabricate a laminated unitary structure comprised of a plurality of fluid amplifiers interconnected to form a desired fluidic circuit.

4. The method for fabricating fluid amplifiers set forth in claim 1 wherein the fluid flow configuration is totally enclosed within the boundary of the laminations to form a first group of laminations, punching a plurality of fluid entrance and exit holes through one half of the fluid flow configuration unformed laminations to form a second group of punched laminations and a third group of unpunched laminations, and superposing predetermined numbers of laminations from the first group in congruent relationship between at least one lamination from each of the second and third groups to form the laminated structures having desired thicknesses.

5. The method for fabricating fluid amplifiers set forth in claim 1 wherein the fluid flow paths of the fluid flow configuration extend to the edges of the laminations and each fluid flow configuration formed lamination is thereby separated into several parts.

6. The method for fabricating fluid amplifiers set forth in claim 4 wherein the step of fastening the superposed laminations comprises diffusion bonding the superposed laminations together to form the unitary structures.

7. The method for fabricating fluid amplifiers set forth in claim 6 wherein the step of diffusion bonding comprises cleaning the first, second and third groups of laminations to remove any contaminating surface film thereon, applying sufficient pressure to the superposed laminations to achieve good physical contact between adjacent laminations, placing the assembly of superposed laminations within an extremely dry hydrogen atmosphere in a furnace, and heating the assembly for a predetermined length of time determined by the material of the laminations, the temperature in the furnace and the pressure applied to the laminations.

8. The method for fabricating fluid amplifiers set forth in claim 7 wherein the material of the laminations is beryllium copper.

9. The method for fabricating fluid amplifiers set forth in claim 6 and further comprising the step of successively punching a plurality of coincident guide holes through each of the first, second and third groups of laminations, and the step of superposing the laminations is accomplished by passing guide pins through the guide holes.

10. The method for fabricating fluid amplifiers set forth in claim 1 wherein the step of fastening the superposed laminations comprises diffusion bonding the super posed laminations together to form the unitary structures.

11. The method for fabricating fluid amplifiers set forth in claim 2 wherein the step of fastening the superposed laminations comprises diffusion bonding the superposed laminations together to form the unitary structures.

12. The method for fabricating fluid amplifiers set forth in claim 5 wherein the step of fastening the superposed laminations comprises diffusion bonding the superposed laminations together to form the unitary structures.

13. The method for fabricating fluid amplifiers set forth in claim 4 wherein the step of fastening the superposed lamination comprises brazing the superposed laminations together to form the unitary structures.

14. The method for fabricating fluid amplifiers set forth in claim 4 wherein the step of fastening the superposed laminations comprises applying an adhesive to the surfaces of the superposed laminations, and applying a sufficient pressure to the superposed laminations to obtain an adhesive bond of the laminations.

15. A method for fabricating fluid amplifiers comprising the steps of severing relatively thin sheets of stainless steel to form a plurality of equidimensional thin laminations, severing relatively thick sheets of stainless steel to form a second plurality of equidimensional thick laminations, punching a plurality of guide holes in congruent relationship through the plurality of thick and thin laminations, successively forming predetermined nonidentical fluid flow patterns defining a fluid amplifier through the thin laminations wherein the patterns are characterized by identical nonrestricted flow paths and nonidentical fluid flow restrictors, cleaning the thick and thin laminations to remove any contaminating surface film thereon, superposing predetermined numbers of the thin laminations in congruent relationship between two of the thick laminations, the superposing accomplished by passing guide pins through the guide holes, applying a pressure of approximately 10,000 pounds per square inch to the superposed laminations to achieve good physical contact between adjacent laminations, placing the assembly of superposed laminations within an extremely dry hydrogen atmosphere in a furnace, and heating the assembly for a predetermined length of time in the range of one to three hours at a temperature of 2100° F. to obtain a diffusion bond of the assembly wherein the assembled fluid amplifier has fluid flow restrictors of odd shapes as determined by the nonidentical fluid flow restrictors, in the fluid flow patterns formed in the thin laminations.

References Cited

UNITED STATES PATENTS

| | | | |
|---|---|---|---|
| 2,871,886 | 2/1959 | Obrebski et al. | 29—495 |
| 2,871,887 | 2/1959 | Obrebski et al. | 29—495 |
| 3,334,401 | 8/1967 | Hopkinson | 29—157.3 |

JOHN F. CAMPBELL, *Primary Examiner.*

PAUL M. COHEN, *Assistant Examiner.*

U.S. Cl. X.R.

29—157.1, 471.3, 472.3, 495; 136—87